United States Patent [19]

Kleinkopf

[11] 4,115,924
[45] Sep. 26, 1978

[54] SPECTACLE LENS MARKING DEVICE

[76] Inventor: Dick L. Kleinkopf, P.O. Box 1660, Fairbanks, Ak. 99707

[21] Appl. No.: 827,580

[22] Filed: Aug. 25, 1977

[51] Int. Cl.$^2$ ............................................. G01B 11/27
[52] U.S. Cl. .................................. 33/174 A; 356/127
[58] Field of Search ................... 33/174 A, 189, 191, 33/200; 351/5; 356/127

[56] References Cited

U.S. PATENT DOCUMENTS

| | | | |
|---|---|---|---|
| 1,622,776 | 3/1927 | Fisher | 33/174 A |
| 1,958,275 | 5/1934 | McCabe | 356/127 |
| 2,723,594 | 11/1955 | Lueck | 356/127 |
| 2,803,884 | 8/1957 | Polley | 33/174 A |
| 3,002,285 | 10/1961 | Wright | 33/174 A |

Primary Examiner—Richard R. Stearns

[57] ABSTRACT

A device is provided for use with a lensometer which will adjustably hold a ground lens as it is moved until its optical center coincides with the line of sight of the lensometer. The device is provided with two spaced apart, fixed markers and a line passing therethrough will indicate a horizontal line passing through the optical center of the lenses when they are fitted into the frames of the eye spectacle. The device is also provided with a movable marker, movable precise amounts in accordance with the prescription of an individual patient for a particular spectacle frame to indicate the geometric center of that lens when mounted in that spectacle frame and for that particular patient.

4 Claims, 8 Drawing Figures

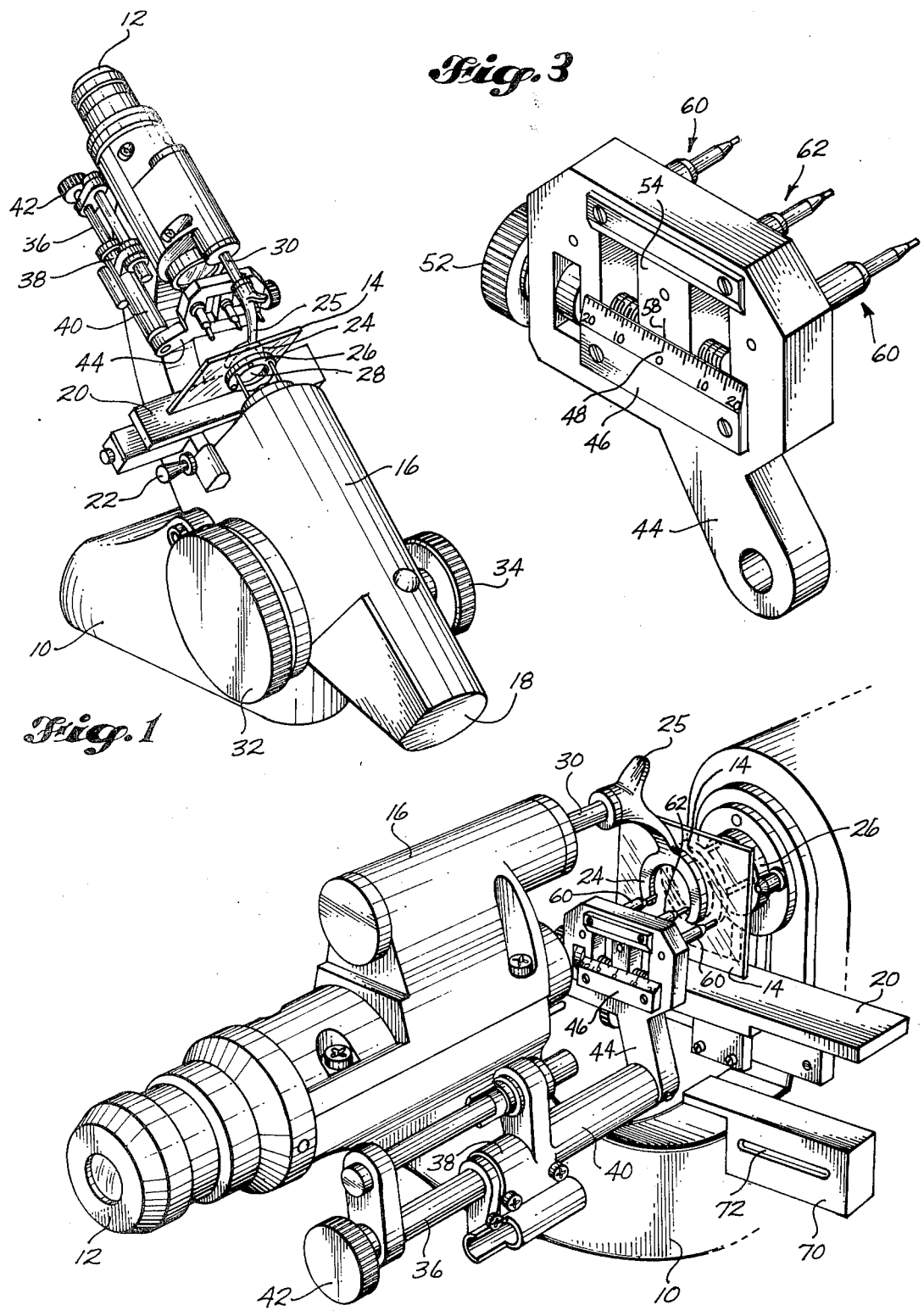

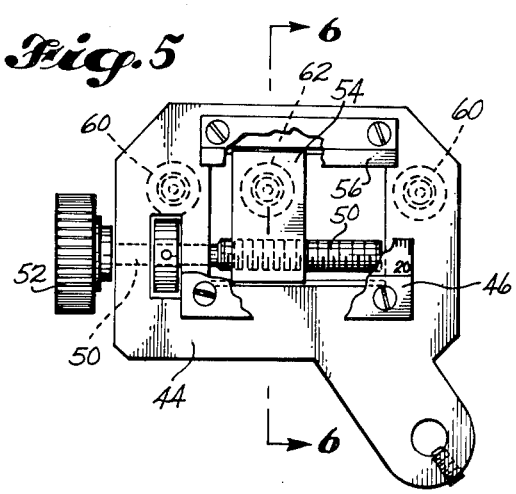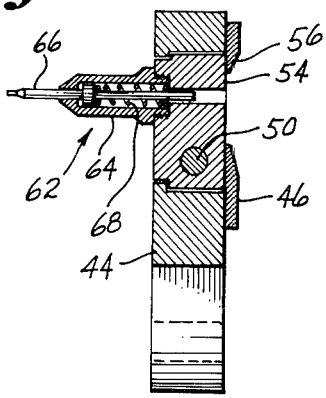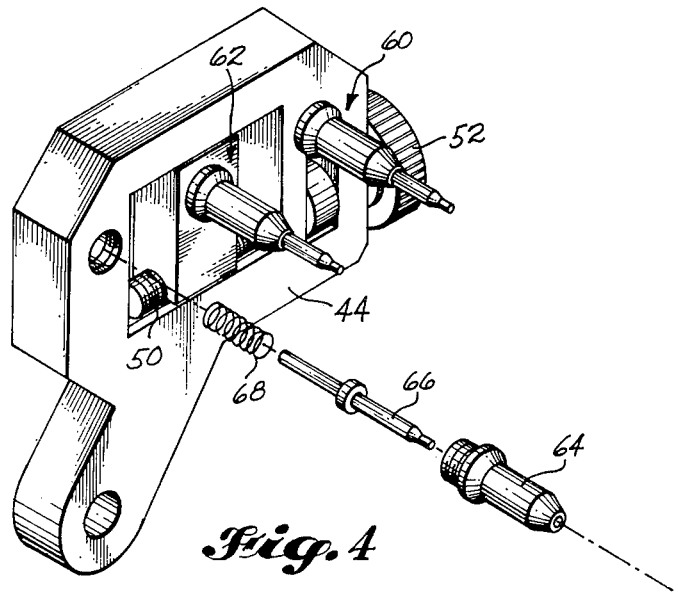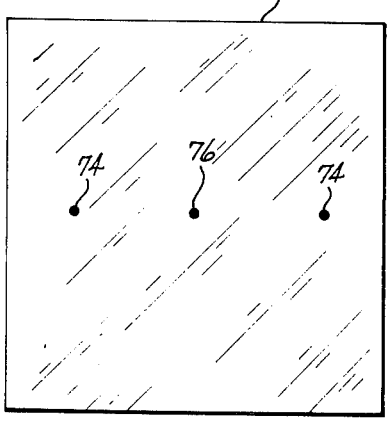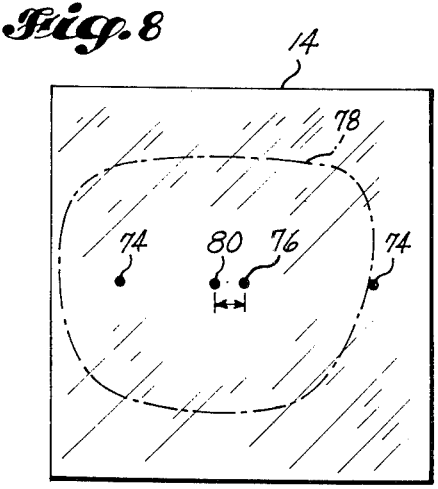

SPECTACLE LENS MARKING DEVICE

BACKGROUND OF THE INVENTION

It has been the practice to have an eyeglass lens ground to the prescription of an eye of a particular patient. The ground lenses were thereafter examined in a lensometer to determine if the lens was, in fact, properly ground to the specification involved. The lensometer was also used to determine the exact location of the optical center to which the eyeglass had been ground and to determine a line which would coincide with a horizontal line in the lens when mounted in the spectacles and which horizontal line would pass through the optical center of the lens. Three marks were placed on the glass, one to indicate the optical center and the other two to indicate the horizontal line. To obtain the geometric center of the lens, when cut to fit a particular frame of eyeglass spectacles, the horizontal difference between the optical center and the geometric center of the lens as mounted in a particular spectacle frame was determined from the prescription. Then a protractor or a millimeter scale was laid on the lens and another mark was made on the lens and it was attempted to place this last mark a precise number or parts of millimeters in accordance with the said difference. Due to human error and faulty equipment, errors were made. In my invention, the lens is held in the same position as it was held when the optical center of the lens was determined. A movable marker starting from the determined optical center is moved by means having micrometer adjustments an amount determined by the difference between the optical center of the lens and the geometric center of the lens when cut to a particular frame. This movable marker and its precise adjustable means eliminates error because of equipment and provides for equipment wherein human error is reduced to a minimum.

SUMMARY OF THE INVENTION

A lensometer is provided with a table for supporting a ground lens. The lens in manually movable sideways on this table. The table is adjustable vertically. Adjustments are made both horizontally and vertically until the optical center of the lens coincides with the line of sight of the lensometer. After the lens has been so adjusted and held in this adjusted position, a marking device is moved to place marks upon the lens. Two spaced apart marks are provided on the lens and the line passing therethrough will indicate a vertical line passing through the optical center of the lens when mounted in a spectacle frame in accordance with the prescription. A third marker is adjustable precisely horizontally and has as its starting point a mark precisely coinciding with the optical center of the ground lens. This marker is moved horizontally amounts required by a particular prescription of a patient for a lens for a certain eye and for a certain spectacle frame. Then this third marker is used to mark this geometric center of the lens and the lens is cut with an outline matching the spectacle frame and wherein the geometric center as marked on the lens becomes the geometric center of the spectacle frame.

DESCRIPTION OF THE DRAWINGS

FIG. 1 is a perspective view showing a lensometer with my invention affixed thereto and with a ground lens disposed in position for examination;

FIG. 2 is a fragmentary perspective view, on a larger scale, and taken from a different angle than that of FIG. 1;

FIG. 3 is a detached perspective view, on a still larger scale, of a lens marking device of my invention;

FIG. 4 is a perspective, exploded view of the structure of FIG. 3 and taken from the opposite side to that of FIG. 3;

FIG. 5 is a front elevational view, with parts broken away, and with some parts shown dotted;

FIG. 6 is a sectional view taken substantially on broken line 6—6 of FIG. 5;

FIG. 7 is a plan view of a ground lens marked by a device of my invention and before adjustment in accordance with the prescription for a particular patient and particular spectacle frame; and FIG. 8 is a view similar to FIG. 7 but showing a center dot, moved as respects the showing of FIG. 7, and which is the geometric center of an eyeglass lens, having an outline coinciding with the dot-and-dash outline, so that the optical center of the eyeglass lens fit the prescription of a particular patient for use in a particular eyeglass spectacle frame.

DESCRIPTION OF A PREFERRED EMBODIMENT

In the drawings, a standard lensometer is shown. These instruments are used for many purposes and the primary purpose of such instruments in connection with the present invention is to determine the optical center of the ground lens and to hold the lens so it can be marked in relation to such center.

A base 10 supports the instrument on a table (not shown) or other suitable supporting surface. The operator looks through adjustable lens 12, through ground lens 14 being examined, through body portion 16, and out opening 18 at a source of light (not shown). The lens 14, being tested, rests on a table or stand 20. The stand 20 is adjustable vertically relative to the base 10 by operation of knurled knob 22. As the lens 14 rests upon and is supported by the stand 20, vertical adjustment of the stand 20 provides vertical adjustment of the ground lens 14.

The ground lens 14 is urged by lens holder frame 24 of lens holder 25 against stop 26 by a spring loaded rod 30 connected with said lens holder 25. Stop 26 has a sight opening 28 therethrough so a line of sight is present from adjustable lens 12 through ground lens 14 and through opening 18 to a source of light.

While the lens 14 is held against unwanted movement by a lens holder frame 24 and stop 26, the lens 14 is manually adjustable sidewise relative to table 20 and at the same time, table 20 (with lens 14 movable therewith) is adjustable vertically until the image on the line of sight of the lensometer indicates that the ground optical center of lens 14 coincides with the line of sight of the lensometer.

Adjustable knurled knob 32 is used to verify that the lens power of the ground lens 14 has a lens power according to prescription given for its grinding. Adjustable knob 34 and adjustable knob 32 are used together to determine if the axis alighment of lens 14 is according to prescription.

The adjustment and the use of the lensometer thus far have been made in accordance with prior art practices and in the interest of brevity have been described, somewhat, in an abbreviated fashion.

The shaft 36 is mounted for sliding and angular movement in a sleeve 38 carried by the frame 40 of the lensometer. A knob 42 connects with shaft 36 for manipulation thereof. Shaft 36 is detachably connected with marker frame 44 (see details thereof in FIGS. 3–6, inclusive). This frame 44 is swung out of the line of sight of the lensometer while adjusting the position of lens 12 and determining the ground optical center thereof by manual sidewise movement of lens 12 and manipulation of knob 42. After the optical center of lens 12 has been determined and aligned with the line of sight of the lensometer, then frame 44 is swung back into marking position and the position shown in FIGS. 1 and 2 of the drawings.

The marker frame 44 carries a fixed scale 46 having a middle or zero marking 48 and with a fixed, calibrated scale thereon, preferably, in millimeters of 20 to each side of zero. The frame 44 rotatively mounts a threaded screw 50 having a knurled knob 52 for rotational adjustment of screw 50. A slide member 54 is mounted for sliding movement relative to the frame 44 by guides 56 and meshes with the threads of screw 50. The number of threads and the pitch of screw 50 thereof provides for micrometer adjustment of slide member 54 relative to the zero marking 48 on the fixed scale 46. A zero marking 58 on slide member 54 registers with the fixed scale 46. When the marker frame 44 is moved into marking position as shown in FIGS. 1 and 2, then the zero markings 48 and 58 are in alignment with the line of sight of the lensometer and the lens 12 has been adjustably moved until the ground optical center thereof is aligned with the line of sight of the lensometer.

The marker frame 44 carries two markers 60 thereto and which are spaced apart a predetermined distance to provide two points through an index line which may be drawn and which line will indicate a horizontal line passing through the optical center of lens 12. Such a line is useful in the grinding of the lens to fit the spectacle frame on which the lens is to be mounted for use by a particular patient.

The slide member 54 carries a single marker 62 which aligns horizontally with the zero marker 48 on the fixed scale 46 and which is aligned vertically with the line of sight of the lensometer.

Each of the markers 60 and 62 comprises (see FIG. 6) a housing member 64, slidably mounting an inking stylus 66, and a spring 68 for spring loading each stylus 66. An inking pad member 70 (see FIG. 2) has an opening 72 aligned to receive all three styli of the markers 60 and 62 and coating each with a marking ink when the styli are urged into contact with the inking material of the inking pad 70. The shaft 36 carries marker frame 44 and said shaft 36 may be angularly turned so the styli 66 will contact the inking material of the pad member 70 or said shaft 36 may be angularly turned to the position shown in FIG. 2 of the drawings.

If the lens 12 has been adjusted so the optical center thereof has been aligned with the line of sight of the lensometer, then the said marker 62 could mark the optical center of lens 12. In FIG. 7, the markers 60 and 62 have been used to provide marks 74 by markers 60 and one mark 76 by marker 62. In the prior art, a protractor or millimeter scale was placed on lens 12 and a number of millimeters was measured off from mark 76 and a dot placed on the lens 12. The amount measured was the variance determined for a particular prescription as the difference between the optical center and the geometric center of the lens when placed in a certain eyeglass spectacle. However, due to human error and due to the inherent equipment involved, errors were made and the lenses were not always fitted exactly to prescription.

Instead of such prior art procedure, the knob 52 of the present invention is turned until the exact number of millimeters variance for a particular prescription appears on the fixed scale 46 in registration with the zero marker 58 of the slide scale 54. Then the lens is marked by the marking dots 74 and 80 shown of FIG. 8 of the drawing. In such figure, the dots or marks 74 indicate two points on a horizontal line which passes through the optical center of the lens 12. The dot or mark 80 indicates the geometric center of a completed lens having an outline as indicated by the dot-and-dash line 78. This geometric center 80 has thus been moved to the left, as shown in FIG. 8, from the optical center 76 around which the lens 12 was ground. The geometric center of the final lens may be to the right or to the left of the optical center of the lens as the optical center of the lens must be aligned with the pupil of the eye of the patient regardless of the size of the glasses, the size of the frame, and the individual measurements of the patient.

GENERAL SUMMARY

It will now be manifest that I have provided a marking device which is used in combination with a lensometer for determining the optical center of a ground lens to be fitted to an eyeglass spectacle frame. This lensometer has a vertically adjustable table 20 to support a horizontally movable lens 12 until the ground optical center of such lens 12 coincides with the line of sight through the lensometer. In combination with such a lensometer, I have provided spaced apart marking devices 60 carried by a frame 44, the marking devices 60 providing outside marks 74 which determine the location of a horizontal line which passes through the optical center of the lens 12. A fixed scale 46 is carried by frame 44 and is provided with a zero marking 48 and millimeter marking divisions to each side of the zero marking 48. The slide member 54 is mounted for sliding movement relative to the fixed scale 46. The slide member 54 is provided with an indicia means thereon, such as zero marking 48 registering with the fixed scale 46. The slide member 54 has a marker 62 registering with its zero mark 48. The slide member 54 and its zero marking 58 are movable adjusted amounts selected from the prescription for a particular patient and for particular spectacle frames and thus the spacing, between the optical center of the ground lens and the geometric center of the lens when mounted in a particular eye spectacle frame, will be the prescription for a particular patient.

The marker frame 44 is movable to the position shown in FIGS. 1 and 2 of the drawing for marking the lens 12 and out of the line of sight of the lensometer when the lensometer is being used and when the styli 66 of the markers 60 and 62 are being inked from the inking pad member 70.

The adjustment of the slide member 54 relative to the fixed scale 46 is by way of a threaded screw 50 and knob 52 to provide for micrometer adjustments where the scale is divided into millimeters and the overall range of the scale is at least 40 millimeters.

Obviously, changes may be made in the forms, dimensions, and arrangements of the parts of my invention without departing from the principle thereof, the above setting forth only a preferred form of embodiment.

I claim:

1. In combination with a lensometer for locating the optical center of a ground lens for eye spectacles having means to move the lens relative to the line of sight of the lensometer until the optical center of the lens coincides with the optical center determined by said lensometer, the improvement comprising a frame carried by said lensometer; spaced apart, first lens marking means carried by said frame for marking said lens with two spaced apart marks located at predetermined positions with respect to the optical center of said ground lens, the two spaced apart marks and the optical center being colinear; and first fixed scale carried by said frame; a slide member slidably connected with said frame, having a reference mark thereon cooperating with said fixed scale, and having a second marking means for forming a mark in a predetermined spaced relationship with respect to said reference mark; and means for adjustably moving said slide member amounts corresponding to the desired spacing between the optical center of the ground lens and the optical center of the lens when mounted in an eye spectacle.

2. The combination of claim 1, wherein said frame is pivotally mounted to swing clear of the line of vision of said lensometer when determining the optical center of the lens.

3. The combination of claim 1, wherein said adjusting means includes a screw which is rotatively mounted in said frame threadedly engaging said slide member and the extent of travel of the slide member depends upon the extent of rotation of said screw.

4. The combination of claim 1, wherein said fixed scale is calibrated in millimeters and has a length of at least 40 millimeters.

* * * * *